United States Patent [19]

Wienck et al.

[11] Patent Number: 5,265,247
[45] Date of Patent: Nov. 23, 1993

[54] LABORATORY DATA STORAGE AND RETRIEVAL SYSTEM AND METHOD

[75] Inventors: Lynn K. Wienck; Gordon A. Turner; Jim B. Surjaatmadja, all of Duncan, Okla.; Allen F. Strange, Laurel, Miss.; John Burkhalter; Stephen R. Henry, both of Duncan, Okla.; Stephen W. Almond, Wassenaar, Netherlands

[73] Assignee: Halliburton Company, Duncan, Okla.

[21] Appl. No.: 29,367

[22] Filed: Mar. 10, 1993

Related U.S. Application Data

[63] Continuation of Ser. No. 567,860, Aug. 15, 1990, abandoned.

[51] Int. Cl.$^5$ ............................................. G06F 15/40
[52] U.S. Cl. ............................... 395/600; 364/420; 364/422; 364/172; 364/DIG. 1; 366/6; 366/8
[58] Field of Search ............... 366/6, 8; 364/172, 420, 364/422; 395/600

[56] References Cited

U.S. PATENT DOCUMENTS

| | | | |
|---|---|---|---|
| 4,315,309 | 5/1982 | Coli | 364/200 |
| 4,347,568 | 8/1982 | Gigeure et al. | 364/300 |
| 4,488,815 | 12/1984 | Black | 366/8 |
| 4,676,832 | 6/1987 | Childs et al. | 106/90 |
| 4,835,372 | 5/1989 | Gombrich et al. | 235/375 |
| 4,857,716 | 8/1989 | Gombrich et al. | 235/462 |
| 5,027,267 | 6/1991 | Pitts et al. | 364/172 |
| 5,114,239 | 5/1992 | Allen | 366/6 |

Primary Examiner—Thomas C. Lee
Assistant Examiner—Paul R. Lintz
Attorney, Agent, or Firm—James R. Duzan; E. Harrison Gilbert, III

[57] ABSTRACT

A method for maintaining in a computer memory laboratory test records for a plurality of projects, particularly adapted to projects for cementing oil or gas wells, are disclosed. Records of data identifying the plurality of projects and records of test data for the plurality of projects are entered within the computer memory. Data from selected records are compiled in a predetermined report format. More particularly disclosed is a method of designing a cement job for an oil or gas well. This includes receiving into a computer, programmed with records of data in predetermined categories for a plurality of previous cement jobs, a field of search for a selected predetermined category of data pertinent to a cement job being designed. Automatic searching within the computer finds records which contain data within the field of search. These are displayed. Design data are selected in response to the displayed records and the design data are stored in the computer in a record for the cement job being designed. Modifications can be made if desired after the initially defined design has been tested. Also disclosed is the direct entry of test data into the computer from test equipment in which a selected design has been tested.

1 Claim, 6 Drawing Sheets

```
LABORATORY SYSTEM
     VERSION
```

```
A  -  PRINT DATA FORM
B  -  SELECT CEMENT DATA
C  -  MODIFY CEMENT DATA
D  -  VIEW CEMENT DATA
E  -  SEARCH CEMENT DATA
F  -  SELECT REPORT DATA
G  -  MODIFY REPORT DATA
H  -  VIEW REPORT DATA
I  -  SELECT PARAMETERS
J  -  MODIFY PARAMETERS
K  -  VIEW PARAMETERS
L  -  SELECT COLORS
M  -  CEMENT DIRECTORY
N  -  REPORT DIRECTORY
O  -  EXIT
```

FIG. 5

LABORATORY REPORT

Disclaimer

Date: February 27, 1990
Project: Z-001-A01

Mr. John Brown
Section Supervisor
Acme Point, Inc.
Denver, CO 80364

Company : Acme West          State:   Oklahoma    OK
Job Type : Casing
Measured Well (feet) : 15500  BHCT (F): 295
BHST        (F) : 310         BHP (F): 16000

Purpose:   Tests for 2 cement slurries have been performed.
           1. Thickening Time    2. Rheology Comment:   Laboratory Manual #74
Comment:   Page 22, Paragraph 6

Respectfully submitted,

_____ cc:  Mr. Tom Smith    Mr. Dick Jones    Mr. Harry Moe

Disclaimer

FIG. 6

LABORATORY DATA STORAGE AND RETRIEVAL SYSTEM AND METHOD

This is a continuation of copending application Ser. No. 07/567,860, filed Aug. 15, 1990, now abandoned.

BACKGROUND OF THE INVENTION

This invention relates generally to a system and a method for maintaining laboratory test records for a plurality of projects. This invention relates more particularly to a record keeping machine system and a method of maintaining records for oil or gas well cementing operations. A particular aspect of the present invention pertains to a method of designing a cement job for an oil or gas well.

Computers have been used in many areas to store data and to permit efficient use of the data. One particular area where computers have not, to our knowledge, been adequately used for this purpose is in the oil and gas industry cement testing laboratory.

The drilling and completion of an oil or gas well frequently includes cementing a casing into the well bore as is well known in the industry. In a cement testing laboratory, samples of different cement slurries are tested for various characteristics to determine if the slurry is appropriate for a particular well (e.g., can it be adequately pumped, will it properly bond the casing in the well bore). Examples of tests include rheology, API crush tests, static gel strength, free water, thickening time, set and wait-on-cement times.

In the past, data relating to oil and gas operations, cements, cement tests, well descriptions, and other related conditions have been stored using a paper filing system. An operator manually records data using pencil and paper or temporarily stores the data using a laboratory test device. At a later time, a report is typed using pertinent data manually collected by looking through the papers. A report in plotted or numerical form from the laboratory test device data might be appended to the manually prepared report. Once the report is completed, the data on the laboratory device is typically destroyed. A search of the data for a specific set of conditions requires browsing through the handwritten or typed papers.

Shortcomings of this type of system include lost or misplaced data, inaccessibility of data at critical times or when search time is short, and the inconvenience or impossibility of making correlations between or among a large amount of data. This type of manual or paper system is not conducive to fast responses to customers' inquiries.

The collection of data concerning well characteristics, cement properties, and corresponding cement tests has been a primary interest to field operators, laboratory technicians and service companies to allow them to efficiently design cement jobs for oil or gas wells. Such data provides the designer a tool which allows him to evaluate past jobs in order to design a cement job for a particular well. It is therefore important that the data from prior jobs can be readily retrieved for this purpose. There is thus the need for a computer system and method for filing data of well characteristics, slurry design, and test results to permit more efficient storing and retrieving of this critical information.

Although such system and method are needed, providing a system and a method which are flexible, easy to implement, but which have wide-ranging application, presents a challenging problem. Differences in slurry design terminology, test applications and results, and units of measure combine to present difficulties for computer software design of practical implementations of such system and method. Software which can operate on a variety of personal computers, printers and plotters is also a demanding consideration. Development of such system and method requires an understanding of cementing operations for design of input, search, and reporting displays as well as software and hardware configurations.

SUMMARY OF THE INVENTION

The present invention overcomes the above-noted and other shortcomings of the prior art by providing a novel and improved system and method for maintaining laboratory test records for a plurality of projects, particularly those related to oil or gas well cementing operations. In a particular aspect, the present invention provides a method of designing a cement job for an oil or gas well.

The present invention permits the entry and storage of data on a personal computer also programmed to permit retrieving, searching and reporting on slurry design information, slurry test information and well information. This information can be readily recalled and selected to create new slurry designs. The permanent, flexible technique for storing this information provides an easy means of loading and retrieving it. Additionally, as new additives and cement blends are developed, they can be installed in the permanent storage for future reference.

The present invention provides a permanent file of slurry and report information. It provides calculations based on slurry information. It automatically searches acquired files for designated well, slurry, or test information. It provides a standardized means of reporting and filing information. It further provides a means of sharing data and reports quickly and easily.

The present invention can be used for many purposes, including accepting samples and test orders, scheduling work, tracking samples, accepting and archiving test data, printing and distributing reports electronically, archiving report information, and analyzing data. These are achieved through the flexible operator interface and full function data management capabilities of the present invention. This increases lab efficiency creating faster turnaround times to customers' inquiries. Improved quality control should also be realized.

The present invention is broadly defined as a system for maintaining laboratory test records for a plurality of projects, comprising: means for entering within a computer memory records of data identifying a plurality of projects and records of test data for the plurality of projects, each of the records formed of signals retained in the computer memory; means for defining within the computer memory a predetermined report format; and means for compiling in the predetermined report format data from selected ones of the records. In a contemplated embodiment, the system further comprises testing means for performing a selected laboratory test, the testing means including means for producing a signal coded to represent a test result; and the means for entering includes means for receiving the signal from the testing means and for using the signal in creating within the computer memory at least one of the records of test data.

The present invention also broadly provides a method of maintaining laboratory test records for a plurality of projects, comprising: entering into a computer memory records of data identifying a plurality of projects and records of test data for the plurality of projects, each of the records formed of signals retained in the computer memory; defining within the computer memory a predetermined report format; and compiling in the predetermined report format data from selected ones of the records. In a contemplated embodiment, the method further comprises performing a laboratory test and producing and transmitting from the laboratory test a signal coded to represent a result of the test; and the step of entering includes receiving the transmitted signal and using the signal in creating within the computer memory at least one record of test data.

In a more particular aspect, the present invention provides a method of designing a cement job for an oil or gas well, comprising: receiving into a computer a field of search for a selected predetermined category of data pertinent to a cement job being designed, the computer programmed with records of data in predetermined categories for a plurality of previous cement jobs; searching automatically within the computer for records containing data within the field of search and displaying records containing data within the field of search; and selecting design data in response to the displayed records and storing the design data in the computer in a record for the cement job being designed. In a contemplated embodiment, this method further comprises: producing a substance in response to the design data; testing the substance in a testing apparatus and obtaining test data; providing the test data as coded signals at the testing apparatus; and transmitting the coded signals to the computer from the testing apparatus so that the test data are stored in records for the respective predetermined categories of data.

Therefore, from the foregoing, it is a general object of the present invention to provide a novel and improved system and method for maintaining laboratory test records for a plurality of projects. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 5 illustrates a main selection menu as displayed through the system of the preferred embodiment of the present invention.

FIG. 6 illustrates a predetermined laboratory report form of the preferred embodiment of the present invention.

DETAILED DESCRIPTION OF PREFERRED EMBODIMENT

The preferred embodiment of the present invention will be described with reference to maintaining records about oil or gas well cementing projects (e.g., well information) and test data (e.g., rheology) on cement slurries which have been used in wells or which have been designed and tested or are to be tested.

Figure 1:
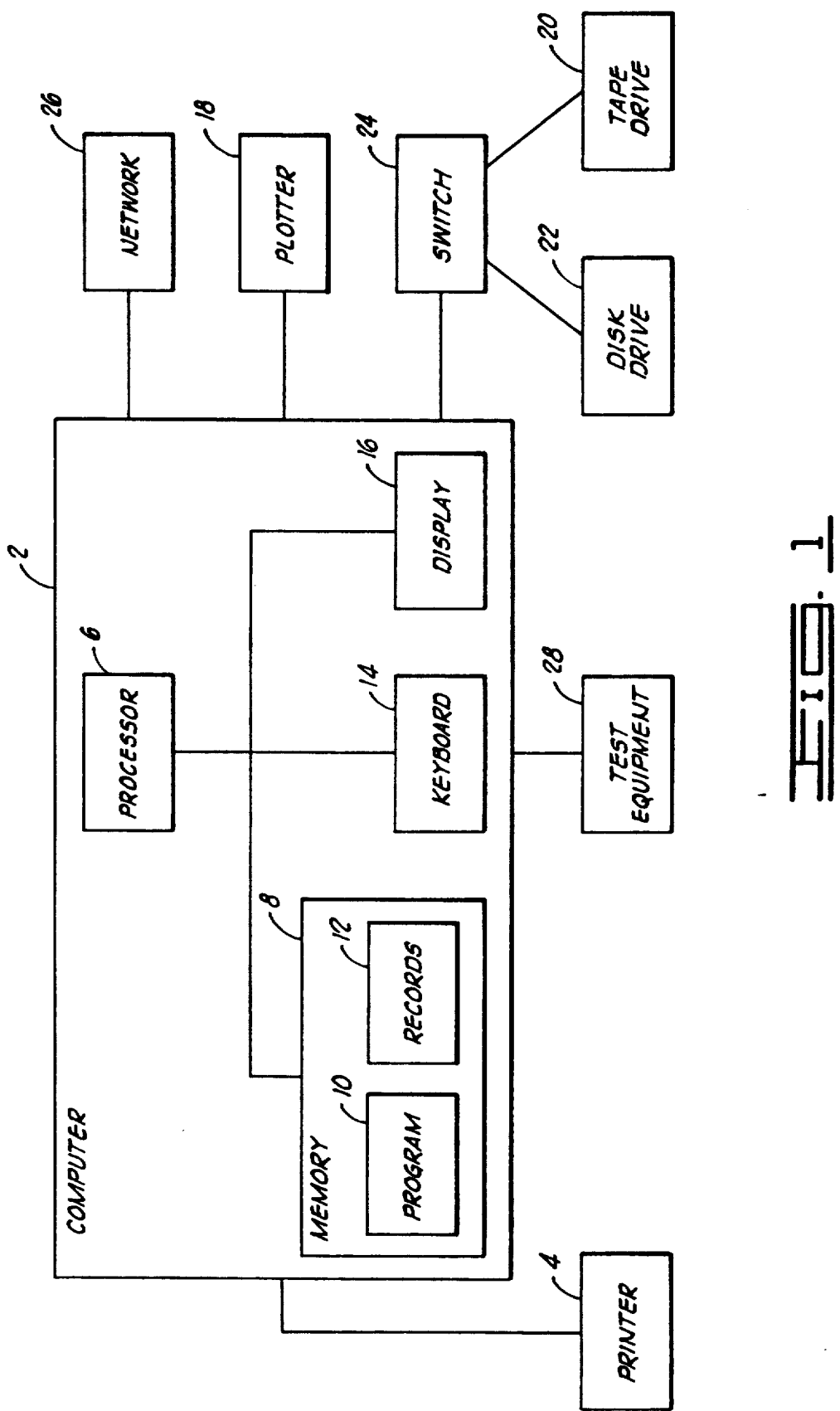
FIG. 1 is a block diagram of a system implementing the present invention.

Referring to FIG. 1, the preferred embodiment of the system of the present invention includes a computer 2 connected to a printer 4. The computer 2 broadly includes a processor 6, a memory 8 (containing a program 10 and information-containing records 12), a keyboard 14 (or other manual entry mechanism such as a "mouse"), and a display 16 (such as a CRT monitor).

The memory 8 is a conventional means for retaining signals within the computer 2, which signals are coded to represent various types of data or information of which specific examples will be given hereinbelow. The memory 8 can be implemented by one or more types of conventional storage media (e.g., integrated circuit, disk). The memory 8 can include different functional components. For example, one part of the memory can be used as temporary storage, wherein current records are handled, and another part of the memory can be used as permanent storage for all the records. These different parts can be physically separated, and they can be implemented by different types of memory devices.

The processor 6 is a conventional device having a known type of bus and port system by which the processor 6 is connected to the printer 4, the memory 8, the keyboard 14 and the display 16 (as well as other devices described hereinbelow). In the preferred embodiment of the present invention adapted to keep records for oil or gas well cementing operations, the processor 6 is programmed, via the program 10, for receiving cementing operation project data and for defining a project record of the cementing operation project data in the memory 8 (within the records 12) in a predetermined format. It is also programmed for receiving cementing operation test data and for defining a test record of the cementing operation test data in the memory 8 in a predetermined format (also within the records 12). The processor is also programmed for selecting project data and test data from the records in response to entered information and for outputting selected project data and test data in a predetermined report format through the printer 4. The processor 6 of the preferred embodiment is still further programmed for searching the records in response to an entered field of search. In the preferred embodiment, the aforementioned types of information or data entered are entered by a suitable entry means including the keyboard 14 interacting with the processor 6 as programmed by the program 10. Through such entry means, signals for operating the computer are entered into the computer 2.

Stated differently, the keyboard 14 and the program 10 in conjunction with a visual display mechanism such as either or both of the display 16 and the printer 4 are included within a control system for controlling the processor 6 to communicate with the memory 8 for storing signals representing data defining cementing operations for specific wells and for retrieving and reporting selected stored data. The control system includes means for creating within the memory 8 records of data identifying a plurality of cementing operation projects and records of test data for the identified projects (both types are included within the records 12). Each of the records is formed of signals retained in the memory. This means is defined primarily by the keyboard 14, the processor 6 and program 10 for the embodiment illustrated in FIG. 1. The control system further includes means for defining a predetermined report format. This is implemented by coding within the program 10. The control system also includes means for selecting from among the records. This is implemented principally by the keyboard 14, the processor 6 and the program 10. The control system still further includes means for visually displaying, in the predetermined report format, data from selected records. This is implemented by the display 16 which provides a temporary display, or by the printer 4, from which a permanent display (hard copy) can be obtained.

A particular implementation of the hardware illustrated in FIG. 1 includes a conventional printer and a conventional personal computer having a 3¼ inch disk drive. Optional equipment illustrated in FIG. 1 includes a plotter 18, a tape drive 20 and a 5¼ inch floppy disk drive 22. The tape drive 20 and the disk drive 22 are connected to the computer 2 through a switch 24. A math coprocessor, a mouse, and a dual asynchronous adapter are also optional. The math coprocessor permits faster computation, and the asynchronous adapter allows for additional serial ports for linking to such devices as laboratory equipment and additional printers and plotters. Recommended minimum memory requirements are 640k bytes with a 10M byte hard disk. Larger hard disk space will allow for more test data to be stored in the system.

If the personal computer attaches to a mainframe computer for offloading, backup, or data networking (as indicated by reference numeral 26 in FIG. 1), additional software and corresponding hardware would be required. Such a link permits report transfers to any locations which have a mainframe computer terminal. The additional software includes both a network package as well as a report transfer package.

Specific equipment for implementing at least some of the foregoing includes:

| Model | Description |
| --- | --- |
| 8580-071 | IBM PS/2 Model 80-071 |
| 6450369 | IBM 80387 Math Coprocessor-16 MHz |
| 6451013 | IBM Dual Asynchronous Adapter/A |
| 25F8448 | IBM 3270 Connection |
| 8513/001 | IBM PS/2 12 Inch Color Display |
| S226001 | Sysgen 5¼ Inch External Disk Drive |
| S229601 | Sysgen 5¼ Inch Disk Adapter/A |
| 0LQ1050 | Epson LQ-1050 Printer |
| 7312-A | Epson LQ-1050 Printer Pull Tractor Feed |
| HP7440A | Zeta or HP-7440 8-Pen Plotter |
| 0000S10 | CA6 Plug Surge Protector |
| 7001066 | Parallel Printer Cable |
| 17255D | Zeta or HP Plotter Cable |
| MSMSEPU | Microsoft Mouse |
| 6280060 | IBM DOS (Version 3.3) |
| EXTRA! | Attachmate EXTRA! 3270 Emulation |
| NOW! | Attachmate NOW! |
| | Central Point Software PCTools |

Also illustrated in FIG. 1 is test equipment 28 connected to the computer 2. In general, the test equipment 28 provides testing means for performing a selected laboratory test, including means for producing a signal coded to represent a test result. In the preferred embodiment, the testing means is for testing a cement slurry and for transmitting directly into the computer 2 signals representing test data about a tested cement slurry. The test equipment 28 is contemplated to include any suitable test devices such as, for the preferred embodiment, a consistometer, viscometer, fluid loss test device, autoclave, UCA, MACS analyzer, MINIMAX, etc. adapted to provide and transmit coded data signals directly to the computer 2. The computer 2 would include conventional means, such as of a type previously referred to hereinabove, for receiving external inputs into its processing system for inclusion in at least one of the records of test data stored as one of the records 12. It is further contemplated that the computer 2 can be programmed to control such directly connected test equipment. Some type of interface device, such as a UNIPRO data acquisition and control device from Halliburton Services, could be connected to the processor bus or ports as part of the computer receiving means to facilitate this automatic data acquisition and control. In general, it is contemplated that data from one or more selected laboratory devices can be automatically downloaded to the computer 2.

The program 10 of the preferred embodiment performs numerous tasks in six broad functions. Through one function, one or more predetermined forms can be printed out through the printer 4 for use in recording test data taken from the test equipment 28. Data from the form can then be manually entered into the computer 2 when the test equipment 28 is not connected for direct downloading to the computer 2. Another function of the program 10 controls the storing of cement data in the records 12, the modification thereof and the viewing and searching of data within the records 12. Data which is entered in the records 12 through the cement data portion of the program 10 includes information entered through the keyboard 14, or directly from the test equipment 28 (when so provided) or from an internal table of parameters. As with the other data or information stored within the memory, the parameters are defined by signals stored in the memory 8. These parameter signals represent an identification and a characteristic of substances used in cementing operations as will be more particularly described hereinbeow.

Cement data contained within the records 12 can be presented in a predetermined report format through a report data function of the program 10. Within this portion of the program there is defined one or more predetermined report formats by which selected data can be presented. This function provides means for compiling in the predetermined report format data from selected ones of the records 12. In the preferred embodiment, selected data are first written into a report file within the memory 8 and then a report in the predetermined format is generated using the report file.

Directory functions of the program 10 allow any one of the records of cement data or records of reports to be viewed, such as through the display 16. A colors function of the program 10 permits background and foreground color selection for the display 16.

Each of the records 12 generated and created by the cement data function and the report data function are, in the preferred embodiment, sequential flat files. Each file contains a fixed amount of storage space. That is, data contained within each record is not compressed based on what data is actually entered. Instead, each record maintains a sequential list of predetermined catagories wherein blanks are entered if no data are provided.

Figure 2:
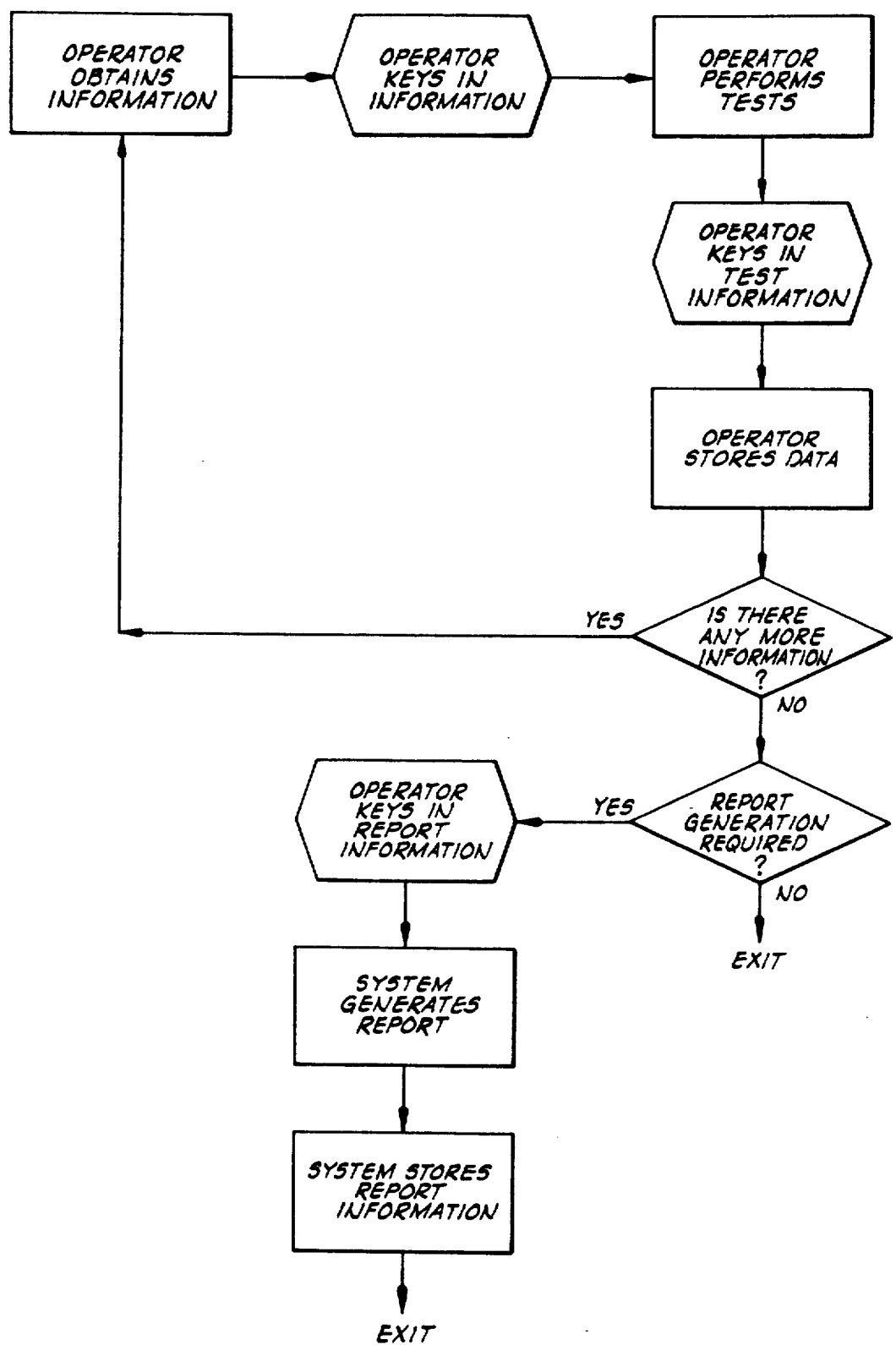
FIG. 2 is a flow chart of the general operation of the present invention.

Referring to FIG. 2, an overview of the operation of the basic system comprising the computer 2 and the printer 4 will be described. Initially, information is obtained and entered for each cement slurry sample which require laboratory testing. Where tests have already been performed or actual cement jobs conducted, records of data identifying the projects and records of the test data for the projects are also entered and stored in the predetermined record format referred to hereinabove as sequential flat files. Slurry design elements such as additives, water types and amounts, cement blends and brands are manually entered into or selected from the system using the keyboard 14. On-site well location information such as pipe and casing sizes, formation, bottomhole static and circulating temperatures, bottomhole pressure, and well location are also entered manually through the keyboard 14.

As laboratory tests are performed, results are manually logged using the keyboard 14 (assuming no direct input from test equipment 28). Test information includes static gel strength, fluid loss, multiple rheology tests, and multiple compressive strength tests. Comments which may have a bearing on slurry, well or test conditions are permitted using additional keyboard input. If desired, a permanent record may be kept of the sample.

A sample submitted for multiple tests can be divided into stages and analyzed in parallel at different work stations within the laboratory. When each test is completed, an entry can be made in the system so that the testing progress of the sample may be tracked using the present invention. This feature allows the laboratory to respond quickly and accurately to telephone inquiries about a sample.

When all testing has been completed for a sample or a set of samples associated with a project, the results are internally automatically tabulated by sample. Selected records can be printed in a concise report, having one or more predetermined formats existing within the program 10. The report is printed from a created report file containing information which has been selected from a stored project record and selected stored test records for the project of the selected project record. If the computer 2 is so connected, the report can also be sent electronically (e.g., to the network 26). The program 10 also includes a mailing list for producing additional copies which can be mailed to other locations and other interested personnel. A permanent record is provided in the system of all reports including the carbon copy list and laboratory costs. The report file of data from which the report was generated or the report itself can be recalled and viewed if desired.

If the test equipment 28 is connected directly to the computer 2 as illustrated in FIG. 1, the relevant information can also be entered directly from the performed laboratory test by producing and transmitting from the test one or more signals coded to represent test data obtained. The coded signals are received directly in the computer 2 and used in creating one or more of the test records.

Figure 3:
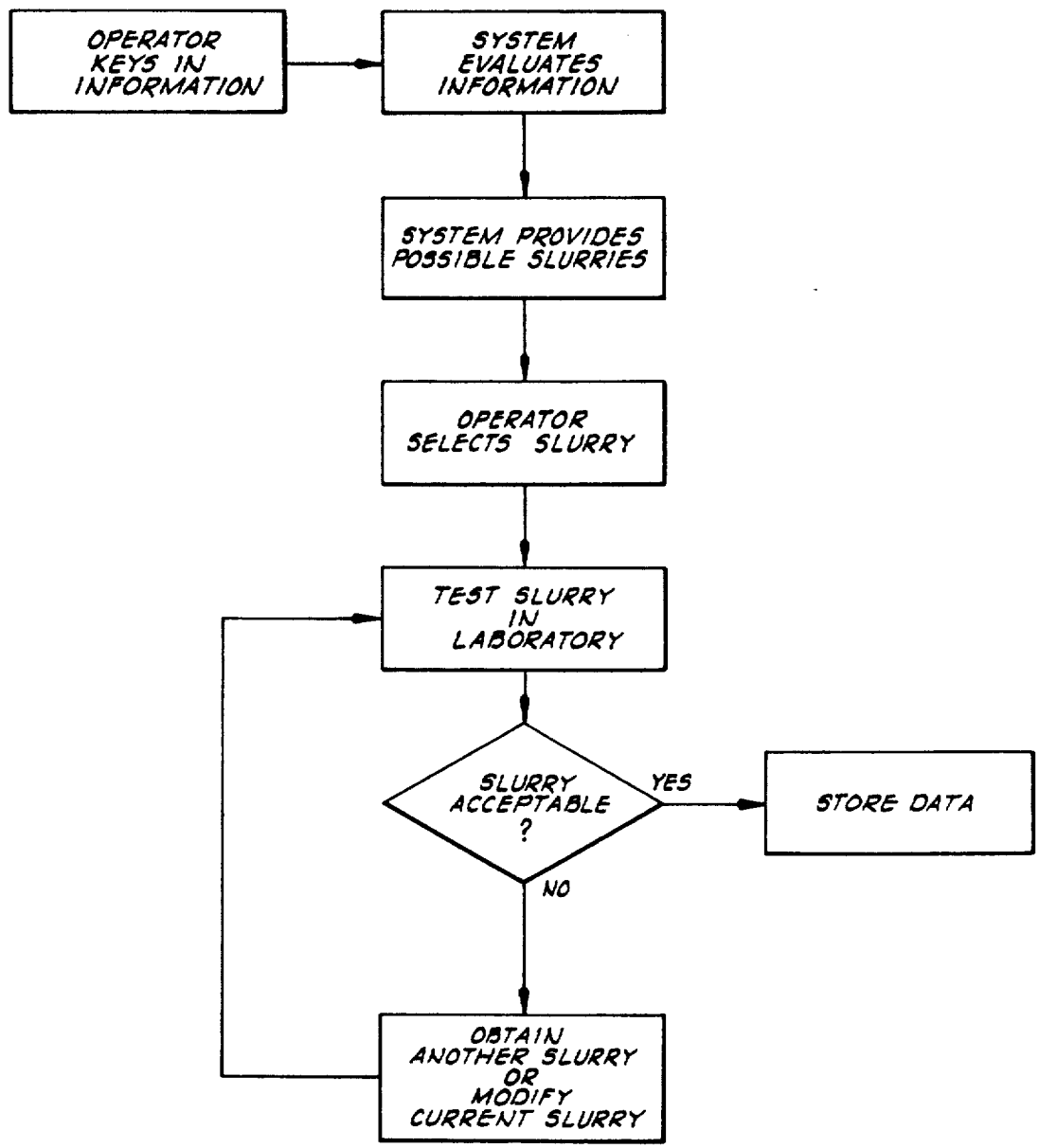
FIG. 3 is a flow chart of the operation of the present invention related to designing a cement slurry.

Referring to FIG. 3, an overview of the particular aspect of the present invention by which a slurry can be designed will be described. Using data stored as described hereinabove, laboratory personnel can quickly and easily locate requested information concerning such items as well location, depth, temperature, slurry additive amount, and test results. Trends may be located using this search function. As an example, by selecting a range of values for a slurry additive element, a correlation can be made between the job or well depth.

The system search function can also be used to locate anomalous well, slurry or test data. For example, an invalid range of values could be selected for a slurry additive element. Any samples located during the search of the records could then be checked against the test results for manual input keyboard errors or test procedural errors. This feature provides both a powerful means of correlating well conditions with slurry characteristics and test results, as well as providing a means of quality control for test operations and reporting data.

Searches may also be used in broad application. Slurry constituents and designs can be located using operator names or area locations. Slurry designs for a particular area or customer can then be developed using prior information. Additive concentrations which are required for a particular slurry can also be located.

When the system is used in this search function, it provides a broad spectrum of slurry designs under many different well conditions. A set of unique well conditions can be selected and the system interrogated as to those slurry designs which fit the described well conditions. This is done by entering one or more fields of search selected from predetermined categories of information defined in the sequential flat files of the records 12. In response to an entered field of search, the system automatically finds the records containing data matching or within the field of search. As shown in FIG. 3, the operator selects and modifies the new slurry design which best fits the well conditions described based on the information presented by the present invention. Testing of this slurry is performed to determine its actual performance and modifications made for re-testing or data stored. Such a search function on well information eliminates the need to develop and test many different possible slurries. The costly process of trial-and-error in slurry development is reduced by having the broad spectrum of available information easily accessible through the present invention.

Figure 4:
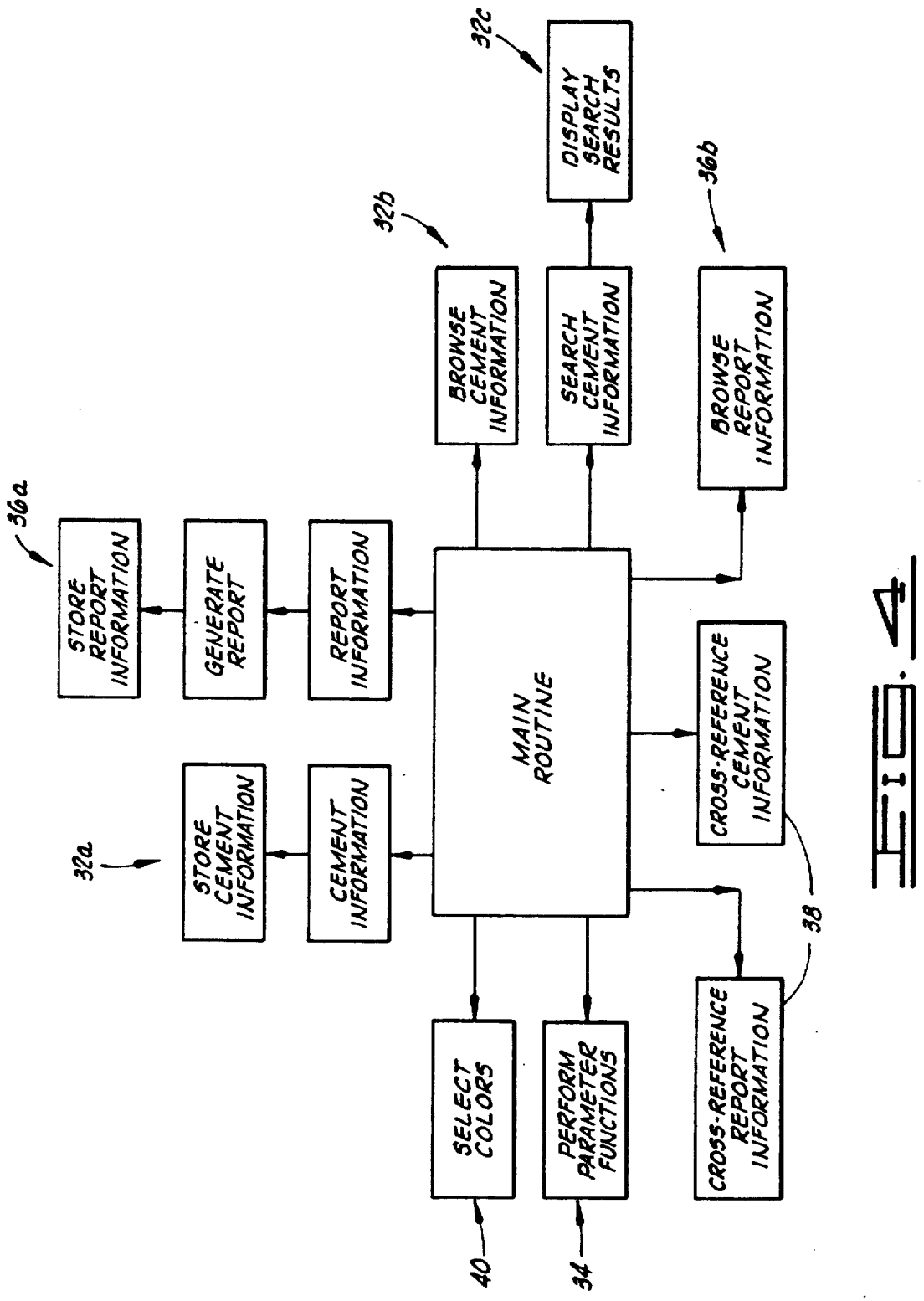
FIG. 4 is a block diagram of the computer software program of the preferred embodiment of the present invention.

Referring to FIG. 4, a diagram of the program 10 for implementing the foregoing, and generally described hereinabove, is shown. As illustrated in FIG. 4, a main routine runs a number of subroutines. A subroutine 32a is used to create and modify the cement data records. Within this subroutine, calculations such as n', k', yield point and plastic viscosity are generated for rheology tests. Given a slurry design, slurry yields and densities are also calculated and displayed. Such calculations provide a check against manually calculated yields and densities.

A subroutine 32b allows the cement data records to be viewed. This browse feature displays all data which has been store within a selected record. Calculations are also displayed during a view. While a search feature of the present invention provides information only on those samples which fit the requirements of the search, the browse or view feature permits a viewing of any sample at any time.

A subroutine 32c performs the previously described search of the cement data records.

A subroutine 34 enables the entering and selecting of various parameters pertaining to cementing jobs.

Subroutine 36a is the subroutine by which stored project and test data are compiled and reported in the predetermined report format.

Subroutine 36b allows generated report records to be viewed in a manner similar to the viewing of the project and test data records. A view of report data provides such information as laboratory costs, man-hours, and machine-hours. This information can be used to submit bids for jobs which will run under like or similar conditions. Such information can be used to determine the type of tests most often performed, for which customers, and at what time schedule. This productivity information can be used as a decision-making tool regarding machine costs and replacement as well as scheduling of personnel time and equipment.

Subroutines 38 implement the directory functions whereby all stored cement and report records can be viewed.

A subroutine 40 implements the display color selection function.

Although not shown in FIG. 4, the preferred embodiment also includes the data-gathering form function previously described.

Also not shown in FIG. 4 are programs which are "stand-alone" in the sense that they are not linked into the main program depicted in FIG. 4. One of these programs permits report transfer from the computer 2 to a mainframe in the network 26. Such a program prompts for the name of the report and the people to which the report will be sent. The report is then sent to the mainframe using an outside software package. A command list which generates a batch file can be initiated to complete the report transfer process.

Another "stand-alone" program permits deletion of records in the data files when it becomes necessary. This program is not linked in the main program to prevent inadvertent or indiscriminate deletion of data. Use of this results in permanent loss of data records.

The software of the preferred embodiment is driven in response to menus displayed through the display 16. Upon booting of the program into the memory 8 of the computer 2, a list of four function keys, F7 through F10, is displayed on the display 16. A selection of F7 calls the program by which reports can be sent to the network 26. F8 permits the definitions of function keys to be modified. F9 selects the program depicted in FIG. 4 of primary interest with respect to the present invention. F10 exits the software.

To utilize the primary features of the present invention, F9 is selected. When this is done, a screen displaying the version number and a proprietary notice is shown on the display 16. This then automatically changes to the main selection menu shown in FIG. 5. It is from this main selection menu that the further description of the preferred embodiment of the present invention will be made.

Main Selection Menu-Print Form

Selection of main selection menu item A, "print data form," prints on the printer 4 a data form for completing when slurry tests are performed.

Main Selection Menu-Cement Data (Subroutines 32,38)

Select/Modify Cement Data

Selection of main selection menu item B or C, "select cement data" or "modify cement data," enters what has been referred to as subroutine 32a shown in FIG. 4. These are two separate functions, but "modify cement data" simply allows modification of data which has been entered during "select cement data."

When "select cement data" is selected, the following menu items appear on the display 16:

| Select Cement Data |
|---|
| A Required Items |
| B Well Data |
| C Comments |
| D Slurry Data |
| E Slurry Design |
| F Free Water |

| -continued |
|---|
| Select Cement Data |
| G Rheology |
| H Fluid Loss |
| I Thickening Time |
| J Gel Strength |
| K API Strength |
| L UCA Strength |
| M Contamination |
| N Clear Well Data |
| O Clear Slurry |
| P Clear Tests |
| Q Store Data |
| R Exit |

Selecting "required items" calls up the following menu:

| Select Cement Data | | | |
|---|---|---|---|
| A Start Date | | | |
| | Required Items | | |
| B Project | Number | [ | ] |
| C Sample | Type | [ | ] |
| D Slurry | Type | [ | ] |
| E Slurry | Number | [——] | |
| F Employee | Number | [ | ] |
| G All | | | |
| H Exit | | | |
| Select: | | | |

This information is required to store the cement record. The "sample type" refers to such information as whether the cement sample is a pilot, field, or quality control slurry. The "slurry number" is the count of the number of slurries for a particular project or for a sample type. All searching, reporting and modifying of data are based on the three entries of project number, sample type and slurry number.

Selecting "well data" calls the following menu:

| Well Data | | | | | |
|---|---|---|---|---|---|
| A Company | | [ ] | M Water Depth | (feet) | —— |
| B Well | | [ ] | N Measured Well | (feet) | —— |
| C Rig | | [ ] | O Vertical Well | (feet) | —— |
| D Formation | | [ ] | P BHST | (F) | —— |
| E Lease | | [ ] | Q BHCT | (F) | —— |
| F Field | | [ ] | R BHP | (PSI) | —— |
| G County | | [ ] | S Casing Size | (inch) | —— |
| H District | | [ ] | T Hole Size | (inch) | —— |
| I State | | [ ] | U Pump Rate | (BPM) | —— |
| J Job | Type | [ ] | V Mud Density | | |
| K Mud | Type | [ ] | W Spacer Density | | |
| L Spacer | Type | [ ] | | | |
| | | | X All | | |
| | | | Y Exit | | |
| Select: | | | | | |

These items of "well data" are of primary interest to those concerned with the day to-day operations and those who wish to archive the data to determine the broader scope of operations. Generally, if such information is not known, it may be left blank, and the data modified at some future date. The more complete the data, however, the better it serves those who rely on its information. It is to be noted that each "project" has only one set of "well data." If additional slurries are designed or used for the project, these are entered by way of "slurry data," selection D from the "select cement data" menu. When "slurry data" is called, items the same as items M through U of "well data" are shown on the display 16. Multiple slurries for which both "well data" and "slurry data" calls need to be made include lead and tail slurries which may be used at different depths and for different hole sizes of the same project.

The "slurry design" item is selected from the "select cement data" menu to enter information about a slurry which is pumped downhole for a field blend or that is to be prepared for a laboratory pilot blend. When this item is selected, the following screen is presented by the display 16:

| Slurry Design A-Batch Date | | | | | | |
|---|---|---|---|---|---|---|
| B Gram | Input | SV | DV | Weight | Grams | Total |
| C Sack | | | | | | |
| D Cement [ ] | —— | —— | —— | —— | —— | —— |
| E Brand [ ] | | | | | | |
| F Additive | | | | | | |
| G Water [ ] | —— | —— | | | —— | —— |
| | Volume | Weight | | | Volume | Weight |
| H Surface Slurry | —— | —— | | | —— | —— |
| I Downhole Slurry | —— | —— | | | —— | —— |
| J Salt (ppm) | —— | | | Sea Water | —— | |
| K Exit | | | | | | |
| Select: D | | | | | | |

Entries in this table are made by selecting the appropriate item. As shown in the above, item D, "cement," has been selected. This calls the following from the table of parameters:

| Cement |
|---|
| A Class |
| B Blend |
| C Exit |
| Select: |

Selecting the "class" item, item A, for example, calls up the following screen:

| Cement Classes | Units of Measure |
|---|---|
| A Class A | ——— [#/sk ] |
| B Class B | ——— [#/sk ] |
| C Class C | ——— [#/sk ] |
| D Class G | ——— [#/sk ] |
| E Class H | ——— [#/sk ] |
| F FONDU | ——— [#/sk ] |
| G Trinity LiteWate | ——— [#/sk ] |
| Maximum Selections: 1 Total Selections: ——— | |
| Select: | |
| W. Page: 1    X → Page    Y ← Page    Z Exit | |

One of the entries from this listing can be selected for automatic entry in the "slurry design" table. The remainder of the lettered entries in the "slurry design" table ar similarly completed.

Several types of calculations are automatically performed during the slurry design phase. If no water is selected, but the slurry yield or density has been completed, the water volume is determined by the system. If the water volume, additive amount, and cement weight have been entered, the slurry yield and density are determined. This provides a check on manually performed calculations. For laboratory testing, a cement gram entry is permitted. Using this entry, the system calculates additive and water amounts.

Referring again to the "select cement data" menu, items F through M call for displayed forms or tables by which test data can be entered for the project and slurries defined through items A through E of the "select cement data" menu. These tests include free water, rheology, fluid loss, thickening time, gel strength, API strength, UCA Strength and contamination. The forms of the preferred embodiment which are displayed when these tests are called are as follows:

| Free Water | | | |
|---|---|---|---|
| | Temperature | Amount | Angle |
| A Free Water #1 | —— | —— | —— |
| B Free Water #2 | —— | —— | —— |
| C Exit | | | |
| Select: | | | |

| Rheology | | | |
|---|---|---|---|
| A Temperature ——— | | N Temperature ——— | |
| RPM Reading | | RPM Reading | |
| B 600.0 ——— | | O 600.0 ——— | |
| C 300.0 ——— | | P 300.0 ——— | |
| D 200.0 ——— | | Q 200.0 ——— | |
| E 180.0 ——— | | R 180.0 ——— | |
| F 100.0 ——— | | S 100.0 ——— | |
| G 90.0 ——— | | T 90.0 ——— | |
| H 60.0 ——— | | U 60.0 ——— | |
| I 30.0 ——— | | V 30.0 ——— | |
| J 6.0 ——— | | W 6.0 ——— | |
| K 3.0 ——— | | X 3.0 ——— | |
| L 1.8 ——— | | Y 1.8 ——— | |
| M 0.9 ——— | | Z 0.9 ——— | |
| 1 CPR — n:— (Turbulent) | | 4 CPR — n:— (Turbulent) | |
| 2 CPR (Plug) — k:— | | 5 CPR (Plug) — k:— | |
| 3 All | YP:— | 6 All | YP:— |
| | PV:— | | PV:— |
| 7 Exit | | | |
| Select: | | | |

| Fluid Loss | | | |
|---|---|---|---|
| Test #1 | | | |
| A Temperature | —— | | |
| B Actual Fluid Loss | —— | @ —:— | Hour |
| C API Fluid Loss | —— | @ 00:30 | Hour |
| Calculated Fluid Loss | | 00:30 | Hour |
| D All | | | |
| Test #2 | | | |
| E Temperature | —— | | |
| F Actual Fluid Loss | —— | @ —:— | Hour |
| API Fluid Loss | —— | @ 00:30 | Hour |
| Calculated Fluid Loss | | 00:30 | Hour |
| H All | | | |
| I Exit | | | |
| Select: | | | |

| Thickening Time | | | |
|---|---|---|---|
| A Start Pressure | —— | B Final Pressure | —— |
| C Start Temperature | —— | D Final Temperature | —— |
| E Start Viscosity | —— | F Final Viscosity | —— |
| G Gradient #1 | —— | F/Min —:— | Hour |
| H Gradient #2 | —— | F/Min —:— | Hour |
| I Thickening Time | | —:— | |
| J All | | | |
| K Exit | | | |
| Select: | | | |

-continued

| Gel Strength | | | |
|---|---|---|---|
| A Start Pressure | ___ | B Final Pressure | ___ |
| C Start Temperature | ___ | D Final Temperature | ___ |
| E Temperature #1 | ___ | @ Dwell Time | ___ : ___ |
| F Temperature #2 | ___ | @ Dwell Time | ___ : ___ |
| G Zero Gel Time (0-100 Lbs/100 Sq Ft) | | | ___ : ___ |
| H Transition Time (100-500 Lbs/100 Sq Ft) | | | ___ : ___ |
| I All | | | |
| J Exit | | | |
| Select: | | | |

| API Strength | | | |
|---|---|---|---|
| Test #1 | | Test #2 | |
| A Curing Pressure | ___ | J Curing Pressure | ___ |
| B Curing Temperature | ___ | K Curing Temperature | ___ |
| C ___ PSI @ ___ : ___ Hour | | L ___ PSI @ ___ : ___ Hour | |
| D ___ PSI @ ___ : ___ Hour | | M ___ PSI @ ___ : ___ Hour | |
| E ___ PSI @ ___ : ___ Hour | | N ___ PSI @ ___ : ___ Hour | |
| F ___ PSI @ ___ : ___ Hour | | O ___ PSI @ ___ : ___ Hour | |
| G ___ PSI @ ___ : ___ Hour | | P ___ PSI @ ___ : ___ Hour | |
| H ___ PSI @ ___ : ___ Hour | | Q ___ PSI @ ___ : ___ Hour | |
| I All | | R All | |
| | | S Exit | |
| Select: | | | |

| UCA Strength | | | |
|---|---|---|---|
| Test #1 | | Test #2 | |
| A Curing Pressure | ___ | M Curing Pressure | ___ |
| B Curing Temperature | ___ | N Curing Temperature | ___ |
| C ___ PSI @ ___ : ___ Hour | | O ___ PSI @ ___ : ___ Hour | |
| D ___ PSI @ ___ : ___ Hour | | P ___ PSI @ ___ : ___ Hour | |
| E ___ PSI @ ___ : ___ Hour | | Q ___ PSI @ ___ : ___ Hour | |
| F ___ PSI @ ___ : ___ Hour | | R ___ PSI @ ___ : ___ Hour | |
| G ___ PSI @ ___ : ___ Hour | | S ___ PSI @ ___ : ___ Hour | |
| H ___ PSI @ ___ : ___ Hour | | T ___ PSI @ ___ : ___ Hour | |
| I Set Time 50 PSI @ ___ : ___ Hour | | U Set Time 50 PSI @ ___ : ___ Hour | |
| J WOC Time 500 PSI @ ___ : ___ Hour | | V WOC Time 500 PSI @ ___ : ___ Hour | |
| K API ___ PSI @ ___ : ___ Hour | | W API ___ PSI @ ___ : ___ Hour | |
| L Load Data from UCA | | X Load Data from UCA | |
| Y All | | Z All | |
| 1 Exit | | | |
| Select: | | | |

| Contamination |
|---|
| A Rheology |
| B Thickening Time |
| C UCA Strength |
| D Exit |
| Select: |

The remaining items listed in the "select cement data" menu permit clearing of the identified data, storing the entered data and exiting back to the main selection menu shown in FIG. 5.

View Cement Data

Selecting item D, "view cement data," from the main selection menu allows the operator to view complete records for each project which has been entered via "select cement data" and "modify cement data." The operator has the option of paging through each slurry, scrolling through all slurries, selecting a cement page, or a specific slurry (based on its location in the data base).

Related, but entered as a separate function, is the ability to display all projects which have been entered in the data base. A cross reference is provided which also links each record in the data base to a particular project and provides the sample type and slurry number of the record. This function is referred to as "cement directory," item M of the master selection menu shown in FIG. 5.

Search Cement Data

Selecting item E, "search cement data," of the master selection menu of FIG. 5 calls the following menu:

| Search Cement Data |
|---|
| A Well & Slurry Data |
| B Slurry Design |
| C Free Water & Fluid Loss |
| D Rheology |
| E Thickening Time & Gel |
| F API & UCA Strength |
| G Search on any item |
| H Search on all items |
| I Display Parameters |
| J Clear Data |
| K Exit |
| Select: |

Selecting one of the "search cement data" menu items calls the corresponding form into which operator-selected field of search information can be entered. A "search" function permits the operator to select a value, range of values, or text items of interest. For example, a search for a formation at a specific depth might yield four slurries which fit the selected depth and formation. These slurries, along with the corresponding well data and test data, are shown on the display 16 with the capability of paging through each slurry, and scrolling through all slurries which fit the field-of-search constraints. A search is permitted on most data entry items. If well characteristics such as bottomhole pressures, temperature and depths are selected, corresponding slurry designs are shown by the system; and if slurries with particular additives in a specific quantity are specified, the system finds well characteristics associated with slurries meeting the entered constraints.

The following are the displays called when the corresponding search cement data menu items A through F are called:

| Well & Slurry Data | | | | | |
|---|---|---|---|---|---|
| A Project | [ ] | P Water Depth | ___ | ___ |
| B Company | [ ] | Q Measured Well | ___ | ___ |
| C Well | [ ] | R Vertical Well | ___ | ___ |
| D Rig | [ ] | S BHST | ___ | ___ |
| E Formation | [ ] | T BHCT | ___ | ___ |
| F Lease | [ ] | U BHP | ___ | ___ |
| G Field | [ ] | V Pump Rate | ___ | ___ |
| H County | [ ] | W Casing Size | ___ | ___ |
| I State | | X Start Date | ___/___/___ | |
| J District | [ ] | Y Employee | [ ] | |
| K Job | | Z Exit | | |
| L Mud | | | | |
| M Spacer | | | | |
| N Sample | | | | |
| O Slurry Type | | | | |
| Select: | | | | |

| Slurry Design | | |
|---|---|---|
| A Class | | |
| B Blend | | |
| C Brand | | |
| D Water | | |
| E Additives | | |
| F Class Type | | |
| G Downhole Volume | ___ | ___ |
| H Surface Volume | ___ | ___ |
| I Downhole Weight | ___ | ___ |
| J Surface Volume | ___ | ___ |
| K Sacks | ___ | ___ |
| L Exit | ___ | ___ |
| Select: | | |

| Free Water | |
|---|---|
| Minimum | Maximum |

-continued

|   | | | |
|---|---|---|---|
| A | Temperature | — | — |
| B | Amount | — | — |
| C | Angle | — | — |

Fluid Loss

|   | | Minimum | Maximum |
|---|---|---|---|
| D | Temperature | — | — |
| E | Actual Loss | ___ @ ___:___ Hour | ___ @ ___:___ Hour |
| F | API Loss | ___ @ 00:30 Hour | ___ @ 00:30 Hour |
| G | Exit | | |

Select:

Rheology

|   | | | |
|---|---|---|---|
| A | Temperature | | |
|   | RPM | Minimum | Maximum |
| B | 600.0 | — | — |
| C | 300.0 | — | — |
| D | 200.0 | — | — |
| E | 180.0 | — | — |
| F | 100.0 | — | — |
| G | 90.0 | — | — |
| H | 60.0 | — | — |
| I | 30.0 | — | — |
| J | 6.0 | — | — |
| K | 3.0 | — | — |
| L | 1.8 | — | — |
| M | 0.9 | — | — |
| N | Exit | | |

Select:

Thickening Time

|   | | | |
|---|---|---|---|
| A | Start Pressure | — | — |
| B | Final Pressure | — | — |
| C | Start Temperature | — | — |
| D | Final Temperature | — | — |
| E | Start Viscosity | — | — |
| F | Final Viscosity | — | — |
| G | Thickening Time | —:— | —:— |

Static Gel

|   | | | |
|---|---|---|---|
| H | Temperature #1 | ___:___ Hour | ___:___ Hour |
| I | Temperature #2 | ___:___ Hour | ___:___ Hour |
| J | Zero Gel Time | ___:___ Hour | ___:___ Hour |
| K | Transition Time | ___:___ Hour | ___:___ Hour |
| L | Exit | | |

Select:

API Strength

|   | | | |
|---|---|---|---|
| A | Curing Pressure | — | — |
| B | Curing Temperature | — | — |
| C | | ___ PSI ___:___ Hour | ___ PSI ___:___ Hour |

UCA Strength

|   | | | |
|---|---|---|---|
| D | Curing Pressure | — | — |
| E | Curing Temperature | — | — |
| F | | ___ PSI ___:___ Hour | ___ PSI ___:___ Hourr |
| G | Set Time 50 PSI | ___:___ Hour | ___:___ Hour |
| H | WOC Time 500 PSI | ___:___ Hour | ___:___ Hour |
| I | Exit | | |

Select:

If a field of search is to be performed with respect to a parameter contained in the parameter table (e.g., "mud" in the above "well & slurry data" screen), a table is presented on the display 16 from which a specific parameter can be selected and in which a desired value or range of values can be entered. An example of such a table is as follows:

Mud Types

|   | | | | |
|---|---|---|---|---|
| A | Waterbase | — | — | [bbl] |
| B | Oil Base | — | — | [bbl] |
| C | Other | — | — | [bbl] |
| D | Other | — | — | [bbl] |
| E | Other | — | — | [bbl] |
| F | Other | — | — | [bbl] |

Maximum Selections: 6   Total Selections: ___
Select:   Range: [   ]
W. Page: 1

X → Page   Y ← Page   Z Exit

If "search on any item" (item G) is selected from the "search cement data" menu, the system will list whatever matches any one of the search selections. "Search on all items" (item H) of the "search cement data" menu yields only those items which match all the search selections.

Selecting menu item I "display parameters" from the "search cement data" menu displays a summary of all table parameters.

The "clear data" selection from the "search cement data" menu clears the entered data, and the "exit" selection returns the system to the main selection menu shown in FIG. 5.

Main Selection Menu-Report Data (Subroutines 36, 38)
Select/Modify Report Data

Selecting item F, "select report data," from the master selection menu of FIG. 5 lists cement projects which are available for report processing. Reports can be prepared for the projects displayed from the cement data records. The sample type and slurry number for a particular project are made available to the operator, who is free to select which slurries and tests will be entered in the report.

Once a project selection has been made, the following screen is produced on the display 16:

Start Date & Time: (current date and time shown)
Select Report Data
(project number shown)

|   | | | |   | | |
|---|---|---|---|---|---|---|
| A | Sample & Slurry | | | | | |
| E | Purpose [ | | ] | | | |
| F | Comment [ | | ] | | | |
| G | Comment [ | | ] | | | |
| H | Comment [ | | ] | | | |
| I | Location | [ | ] | | | |
| J | Location | [ | ] | | | |
| K | Request | by: [ | ] | B | Total Charge | — |
| L | Marked | by: [ | ] | C | Man Hour | — |
| M | Analyzed | by: [ | ] | D | Machine Hour | — |
| N | Signed | by: [ | ] | | | |
| O | Sent | to: [ | ] | | | |
| P | Carbon Copy: | | | | | |
| Q | Generate Report | | | | | |
| R | Clear Data | | | | | |
| S | All | | | | | |
| T | Exit | | | | | |

Select:
Record:

Entries are made in this table to provide further information. Included in the report may be such information as the person or persons who are to receive a copy of the report, the location at which testing was performed, charges for laboratory work, well characteristics, slurry design, and test information. The person or persons responsible for testing of the slurry, report references, and comments can also be included. The selected and entered information are retained in report files in the memory 8.

The report itself is generated by selecting item Q, "generate report," from the above screen. This calls the following menu:

| Generate Report |
| --- |
| A Select Tests |
| B Order Slurries |
| C Write to Screen |
| D Print Plain Report |
| E Print Fancy Report |
| F Write to Files |
| G Write to Network |
| H Exit |
| Select: |

The report can be viewed on the display 16 prior to storing or printing of the report. This procedure minimizes the time preparing reports and generating the output.

Selecting items A or B from the "generate report" menu allows the desired records for the selected tests and slurries to be produced in the report. Item C writes the report to the display 16, and items D and E print the report in either of two predetermined formats. These use the data from the selected report files. Item F stores the report in the records 12. In the preferred embodiment, an exact copy of the report can be permanently retained in the memory 8. Storage is in text files which can be read by the system user. Item G transmits the report to the network 26.

Returning to the main selection menu shown in FIG. 5, a selection of item G, "modify report data," allows the data in the selected report file to be changed. Project information is required to modify report data; however, the same screens are available for modifying report data as used for previously entering it. At the time the report function is exited, the system automatically stores the report record.

View Report Data

Selecting item H, "view report data," from the main selection menu allows all entered report data to be viewed. This function permits browsing of the slurries selected, the list to whom a report was sent, the location, comments, report references, and laboratory charges, etc. Paging through the report record, scrolling through all report records, and selecting a report page or a specific report are permitted functions under this item.

Related, but entered as a separate function, is the ability to display all projects which have been entered into the report data base. A cross reference is also provided which links each record in the data base to a particular project and provides the sample type and slurry number of the record. This is what is entered by selecting item N, "report directory," from the main selection menu shown in FIG. 5.

Main Selection Menu - Parameters (Subroutine 34)

Select Parameters

Selecting item I, "select parameters," from the main selection menu shown in FIG. 5 allows the operator to select only those parameters which will be used during any of the select or modify functions under "select cement data," "modify cement data," "select report data," or "modify report data." Selecting item I from the main selection menu produces the following screen on the display 16.

| Select Parameters |
| --- |
| A Additive Types |
| B Cement Classes |
| C Cement Brands |
| D State |
| E Water Types |
| F Job Types |
| G Mud Types |
| H Spacer Types |
| I Sample Types |
| J Slurry Types |
| K Cement Blends |
| L Sent or Carbon Copy |
| M Exit |
| Select: |

Selecting any one of the foregoing items calls up a respective table by which the identified parameters can be selected. For example, if item A, "additive types," is selected, the following menu is listed:

| Common Parameters Additive Types |
| --- |
| A Cement Materials |
| B Accelerators |
| C Retarders |
| D Friction Reducers |
| E Light Weight |
| F Heavy Weight |
| G Lost Circulation |
| H Salt |
| I Thixotropic |
| J Defoamer |
| K Foam Cement |
| L Fluid Loss |
| M Gas Check |
| O Silicates |
| P Exit |
| Select: |

If item B, "accelerators," is then selected, the following table is displayed:

| Accelerators | | SG | |
| --- | --- | --- | --- |
| A CaCl2 (Hydrated) | | 1.9600 | |
| B CaCl2 (Anhydrous) | | 1.9600 | |
| C CaCl2-L | | 1.9600 | |
| D CalSeal | | 2.7000 | |
| E Diacel A | | 2.6200 | |
| F HA-5 | | 2.0008 | |
| G Other | | | |
| H Other | | | |
| I Other | | | |
| J Other | | | |
| Maximum Selections: | 250 | Total Selections: | |
| Select: | | | |
| W. Page: 1 | X → Page | Y ← Page Z | Exit |

The other parameter selections are made in the same way. Once the parameters have been selected, the subroutine is exited. Return is to the main selection menu of FIG. 5.

Modify Parameters

Selecting item J, "modify parameters," from the main selection menu allows the records within the permanent parameter files to be changed. The permanent files in the current preferred embodiment are: ALL@.DAT, BLEND@.DAT, and NAME@.DAT.

ALL@.DAT contains a permanent record of the following items: additives, cement classes, cement brands, state, water types, job types, mud types, spacer types, sample types, and slurry types. BLEND@.DAT contains a permanent record of the cement blends. NAME@.DAT contains a permanent record of a name directory listing those who may receive reports or copies of reports. The first permanent file is entered by selecting any one of items A through J from the following menu called when item J of the main selection menu of FIG. 5 is chosen; the second permanent file is entered when item K from the following menu is selected; and the third permanent file is entered when item L from the following menu is selected:

| Modify Parameters |
| --- |
| A Additive Types |
| B Cement Classes |
| C Cement Brands |
| D State |
| E Water Types |
| F Job Types |
| G Mud Types |
| H Spacer Types |
| I Sample Types |
| J Slurry Types |
| K Cement Blends |
| L Sent or Carbon Copy |
| M Exit |
| Select: |

Each parameter entry from the foregoing menu will accept up to 250 data items in the preferred embodiment. Each additive type will accept up to 250 items.

View Parameters

Returning to the main selection menu, selecting item K, "view parameters," allows the parameters to be written to the display 16 or via the printer 4.

Main Selection Menu - Colors (Subroutine 40)

Selecting item L, "select colors," from the main selection menu shown in FIG. 5 allows the operator to select from an array of predetermined foreground and background colors for the display 16 of the preferred embodiment.

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

What is claimed is:

1. A method of designing a cement slurry for an oil or gas well in a computer system having a display, comprising the steps of: cataloging substances used in cement slurries for oil or gas wells;

grouping the cataloged substances by types;

storing in said computer system encoded signals defining a first set of distinct records of the grouped types of cataloged substances, wherein each said record identified the substances of a respective type;

determining properties of a plurality of actual cement slurries, said determination being performed by one of experimental and historical means;

storing in the computer system encoded signals defining a second set of distinct records identifying the plurality of actual cement slurries and their respective determined properties, and including at least one of the stored cataloged substances from the first set of distinct records;

entering into the computer system, via a sequence of successive input selecting menus appearing on said display a field of search for a cement slurry to be designed for an oil or gas well, the field of search including at least one of the types of cataloged substances and properties and in automatic response thereto, searching the stored records by said computer system and displaying on said display stored records having entries within the entered field of search, wherein the displayed records are from at least one of the first and second sets of distinct records; and selecting a design cement slurry in response to the displayed records.

* * * * *